United States Patent [19]

Gongora et al.

[11] Patent Number: 4,645,648
[45] Date of Patent: Feb. 24, 1987

[54] SEALING SYSTEM IN A CHEMICAL APPARATUS BETWEEN AN ENLOSURE OF BRITTLE MATERIAL AND METAL COMPONENTS

[75] Inventors: Henri Gongora, Lons; Henri Lalanne; René Perono, both of Pau, all of France

[73] Assignee: Societe Nationale Elf Aquitaine (production), France

[21] Appl. No.: 554,584

[22] Filed: Nov. 23, 1983

[30] Foreign Application Priority Data

Nov. 26, 1982 [FR] France .................... 82 19840

[51] Int. Cl.[4] ............ F16L 49/00; B01J 19/02; B65D 53/00; F16J 15/00
[52] U.S. Cl. .................... 422/186; 49/484; 49/485; 174/50.63; 277/229; 285/238; 285/245; 285/325; 285/425; 285/137.1; 285/909; 285/918
[58] Field of Search ............... 422/186, 405; 174/50.61, 50.63; 49/484, 485, 486; 285/137 R, 325, 245, 238, 425, DIG. 19, DIG. 12, DIG. 10; 277/35, 47, 198, 227, 236, 229

[56] References Cited

U.S. PATENT DOCUMENTS

| | | | |
|---|---|---|---|
| 3,858,891 | 1/1975 | Trelease | 277/229 |
| 4,007,940 | 2/1977 | Chapa | 277/32 |
| 4,121,842 | 10/1978 | Lacy | 277/112 |
| 4,132,399 | 1/1979 | Lechanu et al. | 277/47 |
| 4,141,221 | 2/1979 | Tuson | 29/450 |
| 4,142,742 | 3/1979 | Cornett et al. | 285/136 |
| 4,185,721 | 1/1980 | Karklins et al. | 188/322 |
| 4,416,473 | 11/1983 | Lamy et al. | 285/41 |

Primary Examiner—Stephen J. Lechert, Jr.
Assistant Examiner—Howard J. Locker
Attorney, Agent, or Firm—Ostrolenk, Faber, Gerb & Soffen

[57] ABSTRACT

Improved sealing system between an enclosure of brittle material and a metal apparatus for carrying out chemical reactions, in which a connection member (6) is mounted over the open end (2') of the enclosure (2), with the interposition of a toroidal seal (9) between the opening into the enclosure and the underside of the connection member; a supplementary toroidal seal (11) is inserted between the lateral exterior wall of the enclosure (2,2') and the bore of the connection member (6).

15 Claims, 3 Drawing Figures

FIG_1

FIG_2

SEALING SYSTEM IN A CHEMICAL APPARATUS BETWEEN AN ENCLOSURE OF BRITTLE MATERIAL AND METAL COMPONENTS

The present invention relates to an improved system of sealing between an enclosure of brittle material and metal components. It relates more particularly to reactors comprising a tubular or other enclosure of a brittle material such as glass, quartz or ceramics, connected to a metal chamber or tube, as is the case, for example, in photochemical reactors or in apparatus using a refractory material as a reaction chamber.

In certain forms of apparatus for carrying out chemical reactions, it is necessary to employ enclosures of materials which are inert to the reactants present, at least in a region where corrosion is most likely to occur. In other forms of apparatus, enclosures with transparent walls are utilized, particularly in photochemical reactors, frequently employed for various halogenations of hydrocarbons, in the manufacture of mercaptans and even for some polymerizations, the reactor then generally being of metal and containing coaxially a tube of quartz or special glass, surrounding an appropriate luminous source. In all these cases, the delicate part of the apparatus is formed by the joint between the brittle material, notably glass, quartz or ceramics, and the metal part of the apparatus. In practice, good sealing between these two kinds of parts of the apparatus is necessary in order to avoid any passage of the materials treated in the brittle enclosure into the metal enclosure and vice versa. The joint between the two kinds of material is generally produced by mounting a metal connection member over the head, i.e. one of the ends, usually reinforced, of the brittle material.

In view of the fragility of the vitreous materials mentioned above, forceful tightening of the connection member cannot be used as it can between metal parts; it is necessary to resort to the use of elastoplastic seals to ensure good sealing. The danger of leakage between the surfaces of the joint between the brittle material and the metal thus arises to a certain extent and becomes particularly significant when the apparatus has to operate under pressure. This danger is particularly serious when the reactants treated in the metal parts can react with the contents of the brittle enclosure, possibly causing an explosion. This is precisely the case with hydrocarbons and/or hydrogen sulphide, halogens, sulphurous anhydride etc.

The present invention provides a substantial improvement in the formation of good sealing between the parts of the apparatus of brittle material and those constructed of metal; it suppresses the dangers of leakage of reactants from one to the other of these two zones, while efficiently avoiding escape of the reactants to the exterior of the apparatus. It allows a reactor to be made which can function under pressures which can attain 25 bars.

According to a first characteristic of the invention, in addition to the normal seal inserted between the metal connection member and the opening into the head of the brittle enclosure, the sealing system according to the invention comprises a toroidal seal surrounding the lateral wall of this head; the supplementary seal is compressed by the bore of the connection member in a region situated between its two ends, preferably at about the middle of the bore.

The metal connection member employed in accordance with the invention preferably has an annular shoulder in its bore, to serve for locating the supplementary toroidal seal mentioned above.

According to another important feature of the invention, the sealing system is provided with a device for independent compression of the supplementary seal, after location of the connection member contacting this seal.

Preferably, the compression device according to the invention is mounted so as also to compress the standard seal located around the opening into the enclosure of brittle material, between it and the base of the connection member. Thus, in the apparatus according to the invention, the standard seal is compressed by this independent device instead of by the base of the connection member.

According to another preferred feature of the invention, a complementary seal is placed between the lower extremity of the connection member and the brittle enclosure.

The standard seal and also that located at the lower end of the connection member are preferably located against peripheral inclined surfaces on the head of the brittle enclosure.

While the seals can be made, in known manner, of various more plastic or less plastic materials, such as leather, rubber, vinyl polymers etc., a particularly effective form of seal, notably in the case of the photochemical manufacture of mercaptans under pressure, is constituted by a combination of a silicone core and polytetrafluoroethylene surrounding this core.

The invention will be better understood in the light of the following description of a general diagram and a particular embodiment.

Figure 1:
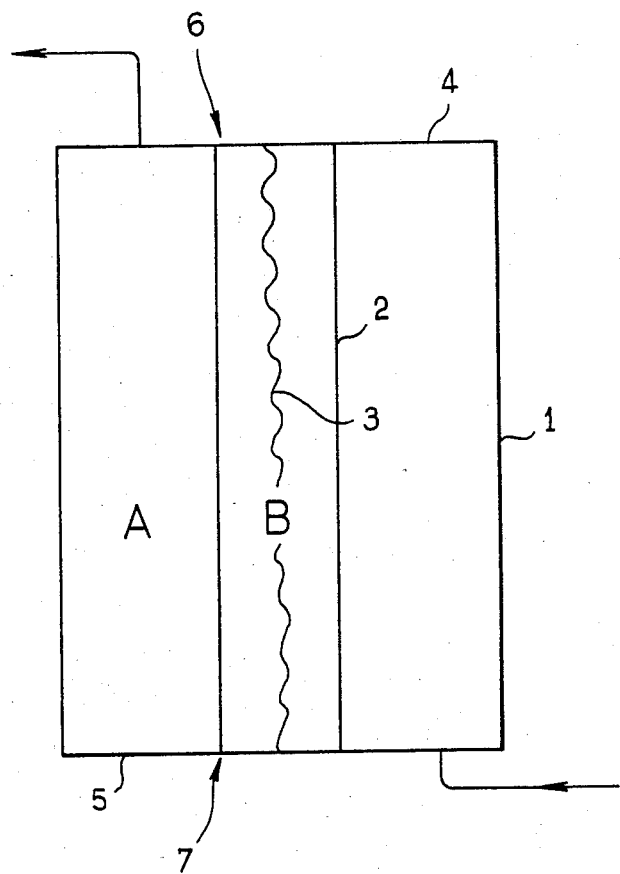
FIG. 1 shows a diagrammatic axial section of a known apparatus comprising a brittle enclosure, surrounded by a metal chamber.

In the very general case of FIG. 1, a cylindrical reactor 1 of suitable metal is traversed inside by the reactant or reactants which will undergo reaction under the effect of the light emitted by a source 3 within the reaction space. The introduction and discharge of these reactants are indicated by arrows. The light source 3, which can be an electrically-heated filament, the flame of a hydrocarbon or hydrogen burner or even an electrical discharge within a gas, is dipsosed within a transparent tubular enclosure 2. Usually, the material of the enclosure 2 is quartz or a special glass. A mercury lamp is a common example. References 4 and 5 respectively designate the upper and lower closures of the apparatus; it is in the regions of these closures, particularly in the regions 6 and 7, where the connections between the enclosure 2, for example of quartz, and the metal closure elements 4 and 5 are located. It is thus in these regions 6 and 7 where it is suitable to provide an appropriate sealing arrangement, so that the reaction medium A cannot communicate with the interior B of the enclosure 2.

In certain kinds of photochemical reactions, the lamp enclosure 2 is only connected at 6 and forms a kind of ampoule in the space A, so that it has no connection with the metal at 7 in the closure 5. Thus, sealing between the quartz and the metal is to be provided at the two extremities of the tube 2 or possibly only at its upper end. Thus, the arrangement according to the present invention, depending upon the industrial cases envisaged, can be provided at the two ends of the enclosure 2 or only at one of its ends.

Figure 2:
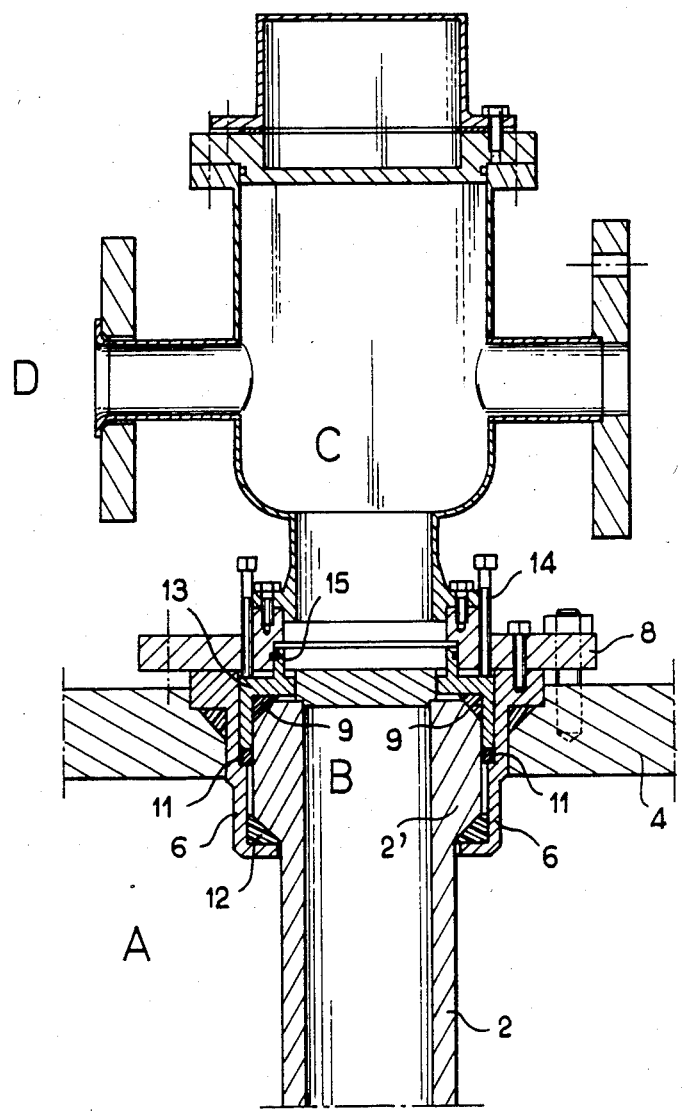
FIG. 2 shows in axial section the upper part of a photoreactor provided with sealing members according to the invention.

FIG. 2 shows in axial section the details of the upper part of the device of FIG. 1, in the region 6. An essential part of this figure is reproduced on a larger scale in FIG. 3. The quartz tube 2 terminates at the top in a reinforcement or head 2', forming an extra thickness or shoulder over which is mounted a metal connection member 6 lodged within the upper closure 4 of the cylindrical reactor 1. For clarity in the drawing, this reactor is not otherwise shown in FIG. 2, where only a part of its closure 4 is indicated; the letter A indicates that the reaction medium is located all around the tube 2 shown. The base of the connection member 6 is held against the closure 4 between the flanges 8 and 13 by means of the bolts shown, without references. Between the upper region of the quartz head 2' and the underside of the compression flange 13, a toroidal elastoplastic seal 9 is located; on the other hand, sealing between the connection member 6 and the closure 4 of the reactor is provided by another toroidal seal 10; these are the usual and requisite locations in the sealing system between brittle tubes and metal parts.

The originality of the invention lies in that, in addition to the usual seals, a supplementary toroidal seal is located circumferentially around the lateral wall of the head 2', between this head and the bore of the connection member 6; this is a seal 11 which is thus placed on the lateral face of the brittle material, preferably at a location approximately in the middle of the height of the connection member 6. In practice, it is preferable for the seal to be located at a distance of about 1 to 10 cm from the upper part of the tube 2.

When the enclosure 2 has no reinforcement and has the same diameter to its end, the connection member 6 is located in the same manner with the supplementary seal 11 on the lateral face of the tube 2.

In the most advantageous case, where the quartz tube 2 ends with a reinforcement 2', it is highly recommendable according to the invention also to insert a seal 12 between the lower beginning of the reinforcement and the end of the connection member 6.

As the drawing shows, the best way to locate the toroidal seals 9 and 12 is to place them against oblique surfaces on the exterior wall of the head 2'.

According to a preferred and important characteristic of the invention, an independent compression device for the seals 9 and 11 is provided in the connection member 6; this device comprises a compression flange 13 and a pressure screw 14 for the flange. By moving the screw 14 down to a greater or lesser extent, the flange 13 is advanced and this compresses the seals 9 and 11 to the desired extent and indirectly, through the intermediary of 2', the seal 12. On the other hand, a rim element of the flange 13 slides within the flange 8 and a ring seal 15 is interposed between this rim element and the bore of the latter flange.

Bedding-in of the seals 9, 11 and 12 by means of the compression flange 13 is independent of the general compression caused by the flange 8 and it is possible to calculate it theoretically and adjust it to the minimum necessary compatible with the mechanical properties of the brittle material, particularly quartz as an example. This bedding-in compression permits simultaneous adjustment of the contact pressure between the parts and the seals 9, 11 and 12; the pressure is thus applied to each seal as a function of the residual elastic flexibility thereof; thus the most highly fatigued seal, namely the least flexible, is the one most highly compressed.

Figure 3:
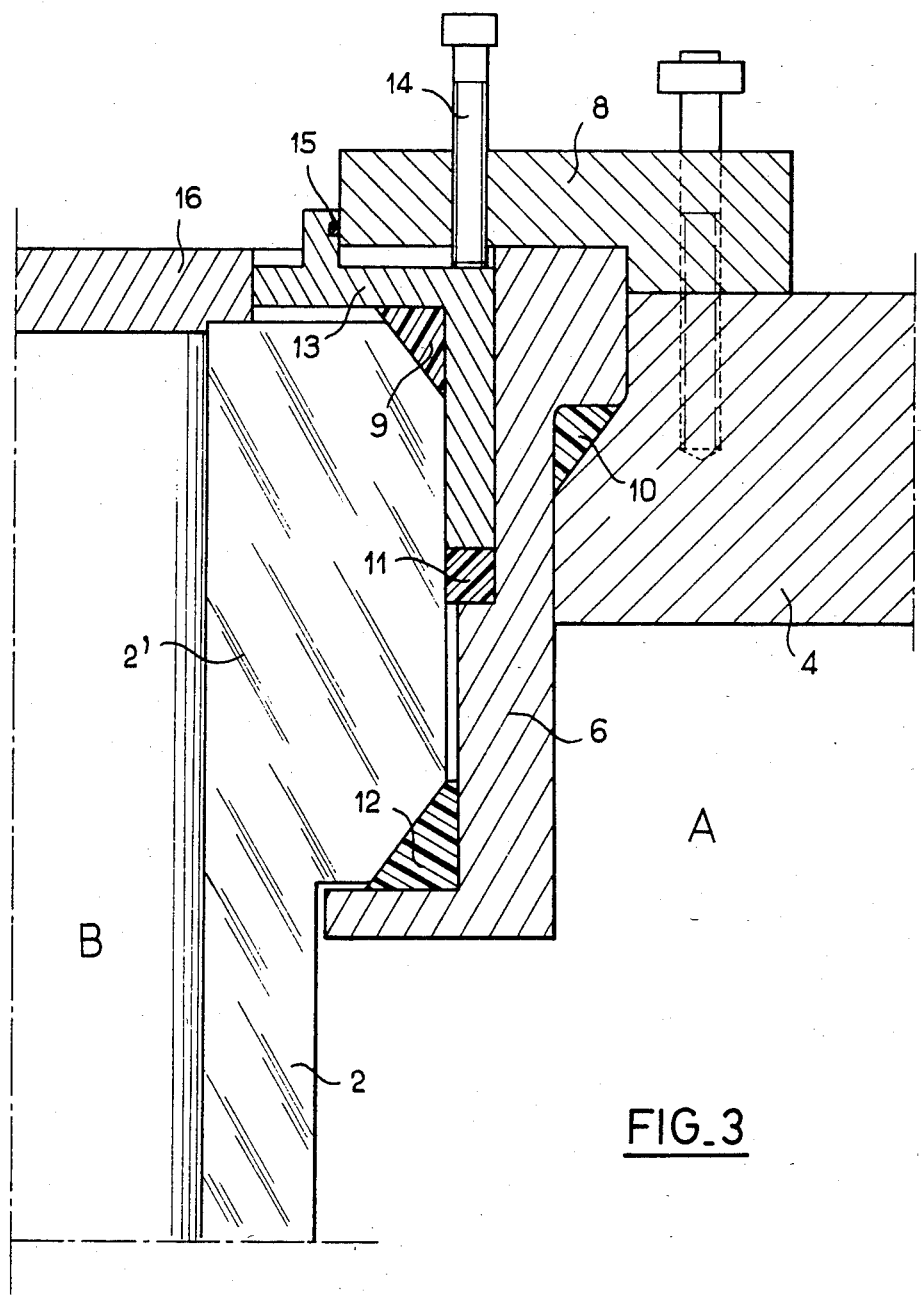
FIG. 3 shows, likewise in axial section, a detail of a part of FIG. 2.

The supplementary seal 11 has the effect of centering the head 2' and avoiding contact of the steel with the quartz; the clearances which result between the walls 2' and 6, 2' and 13, 2' and 16 are shown in FIG. 3; this leads to the following advantage. If, for mechanical or thermodynamic reasons, the housng 2,2' oscillates under the effects of flexion and torsion, the contact pressures between the seals 9, 11 and 12 and the metal parts 6, 16 and/or 13 vary. This can result in forces which make the head 2' oval, resulting in circumferential flexions which can lead to leakages of the reaction medium A. Moreover, as the resistance to leakage of the seals 9 and 12 decreases with time through pulsatory cycling of the contact pressures, the real risk of leakage increases with this cycling. As the seal 11 according to the invention is placed in the median zone of the height of the head 2', it does not undergo these fluctuations; it thus continues to ensure good sealing.

The upper part of FIG. 2 comprises a collector C for gas leading to a torch; this part of the apparatus is not influenced by the sealing system according to the invention. This chamber is provided with an automatic detection system for detecting leakages between the media A and B.

By way of non-limitative example, the sealing system described above is employed in a photochemical reactor for the production of mercaptans by the action of $H_2S$ on olefins under pressure. The apparatus comprises a reactor constituted by a cylindrical envelope of stainless steel, 23.6 cm in diameter and 100 cm in height (known in commerce under the name 316 L). Along the axis of this envelope is located an emitter of light of 3,650 Ångstroms at 3 kw. The lamp of the emitter is supplied with electrical current at 1800 V and it is placed in a quartz sleeve of 70 mm diameter and a thickness of 9 mm. The radiant power at 3650 Ångstroms is 53 w. The luminanace is 40 mw/cm$^2$, the useful length ofthe light source being 500 mm.

The production of mercaptans takes place at about 10° C. under an $H_2S$ pressure of 13 bars.

The apparatus is provided with the seals described above in relation to FIGS. 2 and 3. These seals are formed by a silicone core covered with a "Teflon" sheath; they have a shore hardness of 70 to 80 and the diameter of each torus is 9 to 10 mm.

When the supplementary seal 11 is present, no leakages or explosions occur and, in contrast, in the absence of this seal, leakages occur when this apparatus has been operating for more than 2,500 hours.

We claim:
1. A sealing assembly for a reactor adapted to carry out a chemical reaction comprising a metal wall having an opening therein; a cylindrical enclosure made of brittle quartz or glass having a wall terminating at an open end thereof; said brittle enclosure being disposed within said opening in said metal wall; a cylindrical metallic connection member disposed in sealing relationship with said opening in said metal wall and between said opening in said metal wall and said wall of said brittle enclosure and extending axially along a portion of said brittle enclosure wall to said open end; a first toroidal seal disposed at the exterior edge of said brittle enclosure wall adjacent to said open end; said first toroi- dal seal connecting and sealing said brittle enclosure open end to an interior surface of said metal connection member; a second toroidal seal axially removed from said first toroidal seal and fixed between the exterior surface of said brittle enclosure and an interior surface of said metal connection member for creating a seal connection therebetween; said interior surface of said connection member having a recess extending from said second toroidal seal to adjacent said first toroidal seal and in which said second toroidal seal is disposed; a compression flange disposed in the recess adapted to simultaneously compress said first and second toroidal seals into sealing relationship between said enclosure wall and said connection member; said second toroidal seal at about the mid-point of said extension of said connection member along said brittle enclosure wall at a distance of about 1 to 10 centimeters from said first toroidal seal; a portion of said brittle enclosure wall along which said connection member extends having an enlarged diameter; a third toroidal seal axially removed from said first and second toroidal seals and fixed between the exterior surface of said brittle enclosure wall and said interior surface of said metal connection member for creating a seal connection therebetween; said first and third toroidal seals disposed on oblique surfaces of said enlarged diameter wall; and said toroidal seals comprising a silicone core covered by polytetrafluoroethylene.

2. A sealing assembly for a reactor adapted to carry out a chemical reaction comprising a metal wall having an opening therein; a cylindrical enclosure made of brittle quartz or glass having a wall terminating at an open end thereof; said brittle enclosure being disposed within said opening in said metal wall; a cylindrical metallic connection member disposed in sealing relationship with said opening in said metal wall and between said opening in said metal wall and said wall of said brittle enclosure and extending axially along a portion of said brittle enclosure wall to said open end; a first toroidal seal disposed at the exterior edge of said brittle enclosure wall adjacent to said open end; said first toroidal seal connecting and sealing said brittle enclosure open end to an interior surface of said metal connection member; a second toroidal seal axially removed from said first toroidal seal and fixed between the exterior surface of said brittle enclosure and an interior surface of said metal connection member for creating a seal connection therebetween; a third toroidal seal axially removed from said first and second toroidal seals and fixed between the exterior surface of said brittle enclosure wall and an interior surface of said metal connection member for creating a seal connection therebetween; a portion of said brittle enclosure wall along which said connecting member extends having an enlarged diameter and in which said first and third toroidal seals are disposed on oblique surfaces of enlarged diameter wall; and said toroidal seals comprising a silicone core coverd by polytetrafluoroethylene.

3. A sealing assembly for a reactor adapted to carry out a chemical reaction comprising a metal wall having an opening therein; a cylindrical enclosure made of brittle material having a wall terminating at an open end thereof; said brittle enclosure being disposed within said opening in said metal wall; a cylindrical metallic connection member disposed in sealing relationship with said opening in said metal wall and between said opening in said metal wall and said wall of said brittle enclosure and extending axially along a portion of said brittle enclosure wall to said open end; a first elastoplastic toroidal seal disposed at the exterior edge of said brittle enclosure wall adjacent to said open end; said first toroidal seal connecting and sealing said brittle enclosure open end to an interior surface of said metal connection member; and a second elastoplastic toroidal seal axially removed from said first toroidal seal and fixed between the exterior surface of said brittle enclosure and an interior surface of said metal connection member for creating a seal connection therebetween.

4. The sealing assembly of claim 3 having means to compress the second toroidal seal into sealing relationship between said enclosure wall and said connection member and in which said interior surface of said connection member has a recess, said second toroidal seal being disposed in the recess.

5. The sealing assembly of claim 4 in which said recess extends from said second toroidal seal to adjacent said first toroidal seal and in which said compression means is a compression flange disposed in the recess adapted to simultaneously compress said first and second toroidal seals.

6. The sealing assembly of claim 5 in which said second toroidal seal is at about the mid-point of said extension of said connection member along said brittle enclosure wall.

7. The sealing assembly of claim 6 in which said distance between said first and second toroidal seals is about 1 to 10 centimeters.

8. The sealing assembly of claim 7 having a third elastoplastic toroidal seal axially removed from said first and second toroidal seals and fixed between the exterior surface of said brittle enclosure wall and an interior surface of said metal connection member for creating a seal connection therebetween.

9. The sealing assembly of claim 8 in which a portion of said brittle enclosure wall along which said connection member extends has an enlarged diameter and in which said first and third toroidal seals are diposed on oblique surfaces of said enlarged diameter wall.

10. The sealing assembly of claim 9, wherein said brittle enclosure is made of quartz or glass.

11. The sealing assembly of claim 3 in which said second toroidal seal is at about the mid-point of said extension of said connection member along said brittle enclosure wall.

12. The sealing assembly of claim 3 in which said distance between said first and second toroidal seals is about 1 to 10 centimeters.

13. The sealing assembly of claim 3 having a third toroidal seal axially removed from said first and second toroid seals and fixed between the exterior surface of said brittle enclosure wall and an interior surface of said metal connection member for creating a seal connection therebetween.

14. The sealing assembly of claim 4 in which a portion of said brittle enclosure wall along which said connection member extends has an enlarged diameter and in which said first and third toroidal seals are disposed on oblique surfaces of said enlarged diameter wall.

15. The sealing assembly of claim 3 wherein said brittle enclosure is made of quartz or glass and said toroidal seals comprise a silicone core covered by polytetrafluoroethylene.

* * * * *